(12) United States Patent
Yeo

(10) Patent No.: US 7,079,476 B1
(45) Date of Patent: Jul. 18, 2006

(54) OPTICAL DISC HAVING VARIABLE SPARE AREA RATES AND METHOD FOR VARIABLY SETTING THE RATE OF SPARE AREAS IN THE OPTICAL DISC

(75) Inventor: Woon-Seong Yeo, Cheongju-si (KR)

(73) Assignee: LG Electronics, Inc., Seoul (KR)

( * ) Notice: Subject to any disclaimer, the term of this patent is extended or adjusted under 35 U.S.C. 154(b) by 601 days.

(21) Appl. No.: 09/055,240

(22) Filed: Apr. 6, 1998

(30) Foreign Application Priority Data

May 21, 1997 (KR) .............................. 97/19695

(51) Int. Cl.
*G11B 7/24* (2006.01)

(52) U.S. Cl. .................................. 369/275.3; 369/53.15
(58) Field of Classification Search ............... 369/275.3, 369/275.1, 54, 58, 32, 47, 48, 53.17, 53.24, 369/53.15, 47.14, 53.13, 53.42, 53.16
See application file for complete search history.

(56) References Cited

U.S. PATENT DOCUMENTS

| 5,111,444 | A | * | 5/1992 | Fukushima et al. ............ 369/58 |
| 5,235,585 | A | * | 8/1993 | Bish et al. ..................... 369/54 |
| 5,271,018 | A | | 12/1993 | Chan |
| 5,319,626 | A | * | 6/1994 | Ozaki et al. ................. 369/53.17 |
| 5,715,221 | A | | 2/1998 | Ito et al. ....................... 369/5 G |
| 5,809,201 | A | * | 9/1998 | Nagasawa ..................... 386/68 |
| 6,469,978 | B1 | * | 10/2002 | Ohata et al. ................. 369/275.3 |

FOREIGN PATENT DOCUMENTS

| EP | 0350920 | | 1/1990 |
| EP | 0798712 | * | 10/1997 |
| EP | 0798714 | * | 10/1997 |
| EP | 0813189 | * | 12/1997 |
| GB | 2326015 | * | 12/1998 |
| WO | 96 30902 | | 10/1996 |

OTHER PUBLICATIONS

Standard ECMA –201 Data Interchange on 90 mm Optical Disk Cartriges Capacity: 230 Megabytes per Cartridge pp.41, 43, 44, 47, 48.*
Standard ECMA–272 120 mm DVD rewritable Disk (DVD–RAM) pp 41, 42.*
Patent Abstract of JP2–156477, Publication date Jun. 15, 1990, Katsumi, Iijima, Canon Inc., Application No. JP880308756/881208, IPC.
Patent Abstract of JP8–124304, Publication date May 17, 1996, Yoshiaki, Kawada, NEC CORP, Application No. JP940255773/941020, IPC.
Patent Abstract of JP62–209776, Publication date: Sep. 14, 1987, Takehiko, Shibata, Canon INC, Application No. JP860052187/860310, IPC.

* cited by examiner

*Primary Examiner*—Ali Neyzari
(74) *Attorney, Agent, or Firm*—Birch, Stewart, Kolasch & Birch, LLP

(57) ABSTRACT

In a method for setting variable areas of an optical disc which is variably sets spare area rates of at prescribed quantity provided for preparing a liably-occurring recording error due to a defect of the optical disc and in the optical disc having the variable spare areas, the total quantity of the spare areas installed to the optical disc may be the same as the prescribed quantity. Also, the size rates of the spare areas are variably set in the radius direction by centering about a center portion of the optical disc. Particularly, the more spare area rates are given to the inner circumferential portion and outer circuinterenitial portion, and the less spare area rates are given to the center portion which is relatively stable portion, thereby minimizing the defect occurring rate to decrease the number of defective discs.

19 Claims, 3 Drawing Sheets

OPTICAL DISC HAVING VARIABLE SPARE AREA RATES AND METHOD FOR VARIABLY SETTING THE RATE OF SPARE AREAS IN THE OPTICAL DISC

BACKGROUND OF THE INVENTION

1. Field of the Invention

The present invention relates to an optical disc having spare areas and a method therefor, and more particularly to a method for variably setting the rate of spare areas of an optical disc and an optical disc provided with the variable spare area rates.

2. Description of the Prior Art

The recent development of the information industry increases the need for techniques capable of recording intormation of high density and large quantity. Especially, by entering the multimedia era, a remarkably rapid technical development has been achieved in recording aptive media such as a compact disc (CD) and a digital versatile disc (DVD).

Along with such development and along with a demand for a recording medium of large capacity, optical recording media have become more popular than magnetic media. However, in employing the optical recording system reliability of the recording substance of the optical disc which is the recording medium, is inferior to the reliability of the magnetic disc. Techniques for compensating and/or correcting the inferior reliability have therefore been utilized using an error correction code spare areas and so on.

Spare areas are set by portions in the recording area (i.e., a main area for storing a digital data) of the optical disc, which are not used during the normal recording condition. The spare areas are furnished for the purpose of providing a corresponding spare area that is equivalent to an area of the optical disc that is damaged and thus inoperative to permit the optical disc to normally function as the recording medium on the whole.

That is, the spare area is employed to prepare against damage to the recording area. Spare areas may be arranged a specific places of the optical disc or distributably arranged throughout respective portions within the disc. However, since the spare areas arranged to specific places of the optical disc induce unnecessary movement of the head during reading out and recording data, it is preferable that the spare areas are divided and distributably arranged throughout respective portions within the disc. Also, the recording areas of a recordable optical disc are set by employing a Zoned Constant Linear Velocity (ZCLV) system.

A general format of the above-stated optical disc is illustrated in FIG. 1. Referring to optical disc 10 shown in FIG. 1, a reference numeral 1 denotes a radius of the disc; 2 is an radius of the disc; 3 is a recording area of the disc in which data is stored; are zones divided into a plurality of partitioned areas in the diameter dirction; and 5 are sectors divided in the circumferential direction within zones 4. Not shown in FIG. 1 is a plurality of tracks forming a concentric circle are provided within zone 4.

The tracks, sectors 5 and zones 4 are respectively provided with independent addresses for easily reading out the recorded information, which facilitates the access to desired information by managing the file name of the recorded information and address with respect to the recorded position in accordance with a File Allocation Table (FAT).

In case of initializing the optical disc, the recording area is partitioned into 24 successive zones, and respective spare areas are allotted to zones 4. Because the foregoing spare areas are arranged within respective zones, the information to be recorded onto a portion that probably involves the faulty recording within the zone is recorded on the spare area within the corresponding zone to prevent the defect. The size of the spare area is adjustable. Thus, when the size is increased, the reliability of the disc increased while the recording capacity is reduced relatively.

Therefore, the spare areas are allocated by a prescribed rate in accordance with the size (number of blocks) of the recording area within respective zones, and the size occupies approximately 5.37% which is the prescribed rate of the capacity of zones 4. The sizes of the spare areas per zone are indicated in the following <Table 1>.

TABLE 1

| Zone | Size of Recording Area (No. of blocks) | Size of Spare Area (No. of blocks) | Rate (%) |
| --- | --- | --- | --- |
| 0 | 1901 | 102 | 5.37% |
| 1 | 2010 | 108 | 5.37% |
| 2 | 2122 | 114 | 5.37% |
| 3 | 2234 | 120 | 5.37% |
| 4 | 2346 | 126 | 5.37% |
| 5 | 2458 | 132 | 5.37% |
| 6 | 2570 | 138 | 5.37% |
| 7 | 2682 | 144 | 5.37% |
| 8 | 2792 | 150 | 5.37% |
| 9 | 2904 | 156 | 5.37% |
| 10 | 3016 | 162 | 5.37% |
| 11 | 3128 | 168 | 5.37% |
| 12 | 3240 | 174 | 5.37% |
| 13 | 3352 | 180 | 5.37% |
| 14 | 3464 | 186 | 5.37% |
| 15 | 3576 | 192 | 5.37% |
| 16 | 3686 | 198 | 5.37% |
| 17 | 3798 | 204 | 5.37% |
| 18 | 3910 | 210 | 5.37% |
| 19 | 4022 | 216 | 5.37% |
| 20 | 4134 | 222 | 5.37% |
| 21 | 4246 | 228 | 5.37% |
| 22 | 4358 | 234 | 5.37% |
| 23 | 4475 | 240 | 5.37% |
| Total | 76424 | 4104 | 5.37% |

<Table 1> is obtained by recording the spare areas produced from the DVD standard regulations.

The recording layer of the aforementioiied optical disc is typically fabricated via a sputtering, method which is widely used as one major technique of forming a thin film. Here, it is required that the recording layer of the optical disc fabricated at this time has a characteristic of being consistent throughout the recording area. Accordingly, in order to uniformly maintain the quality of the optical disc, the certainty of such consistency becomes the important requisite.

FIG. 2 is a view showing a mean thickness distribution of the recording layer of the optical disc. As shown in FIG. 2, the center portion of the recording area has the relatively consistent thickness, but the portion adjacent to the inner circumferential portion or adjacent to the center circumferential portion of the disc have the varied thickness. FIG. 2 also shows how the spare area rate remains constant along the radial direction of a conventional disc, as described above with respect to Table 1.

Furthermore during the injection moldings for fabricating a substrate of the optical disc are optically inconsistently due which is formed of a plastic, the inner diameter portion and outer diameter portion of the disc to the differences to resin temperature, cooling time, etc. The deviations of the recording characteristics incited due to the inconsistent substrate and varied thickness of the recording layer currently satisfy the stipulated standard of using the disc, which, however are required to be improved in the aspect of reliability.

Therefore many attempts have previously been made to achieve the desire consistency. Nevertheless, the thickness variation of the recording layer shows a deviation of ±2% currency. Additionally it is a general point of view that the inconsistency, is difficult to be completely eliminated.

As described above, the optical disc allots the spare areas of the prescribed rate (approximately 5.7%) with respect to overall zone capacity in setting the recording area. As described with reference to FIG. 2, the optical disc has inconsistent thickness throughout resulting from the varied thickness in the lengthwise direction of the radius. Consequently, since the defect occuring rates at specific points of the optical disc differ from one another, a specific zone cannot be used further if the defect within the corresponding zone is increased to employ all replaceable spare areas. For this reason, the overall disc may not be used without expressing reduced reliability due to the increase of the defective portions.

SUMMARY OF THE INVENTION

Therefore, it is an obtject of the present invention to provide a method for variably setting the rate of spare areas in an optical disc, wherein, in order to solve the above-enumerated problems, the rates of spare area arranged within the optical disc are variably set.

It is an other object of the present invention to provide an optical disc having variable spare area.

To achieve the above and other objects of the present invention, there is provided an optical disc comprising a main area for scoring digital data, the main area being divided with a plurality of zones: and a spare area, having a variable area rate within the each zone of main area, for storing the corresponding digital data instead of the main area to prepare an occurring data error due to a defect of the main area.

Also, a method for setting spare areas of an optical disc for preparing a liably-occuring recording error due to a defect of said optical disc, wherein the method setting said spare areas of the optical is performed by variably setting the spare area rates of which size rates are variably set in the radius direction of the optical disc.

In the optical disc formed according to the present invention in view of the above construction, the spare area rates provided for respective zones are not constantly allotted per zone, but are variably provided per zone to enable to deal with a liably-occurring defect in accordance with the thickness variation of the disc, thereby improving overall reliability of the disc.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Figure 1:
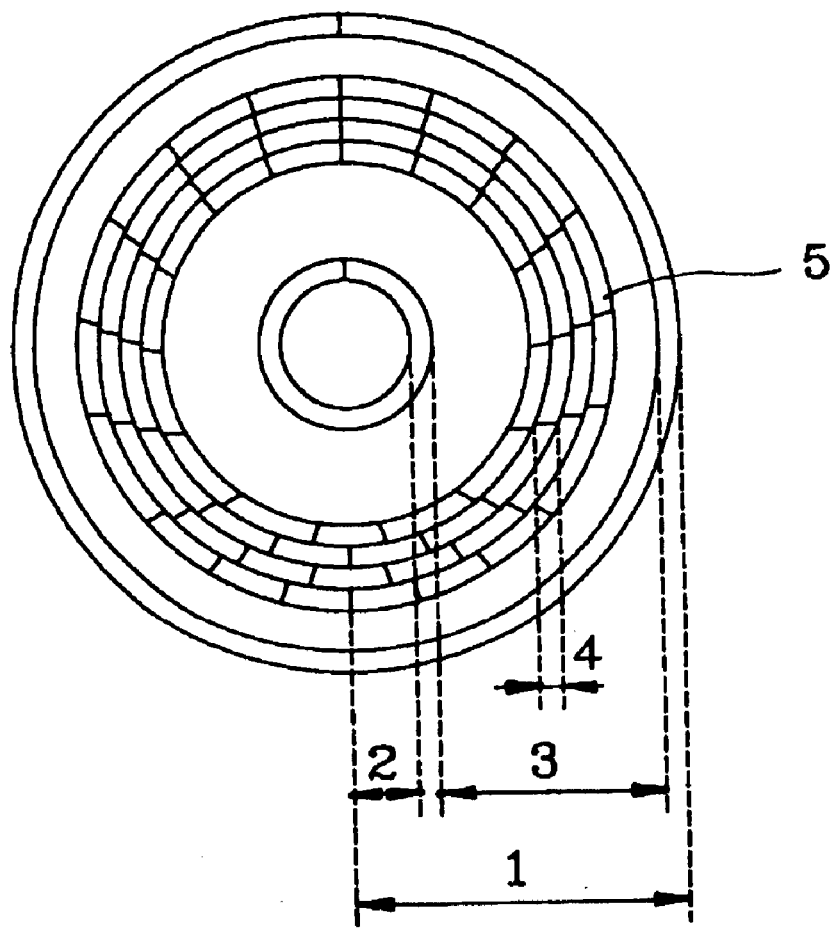
FIG. 1 is a view showing a format of a general optical disc.
Figure 2:
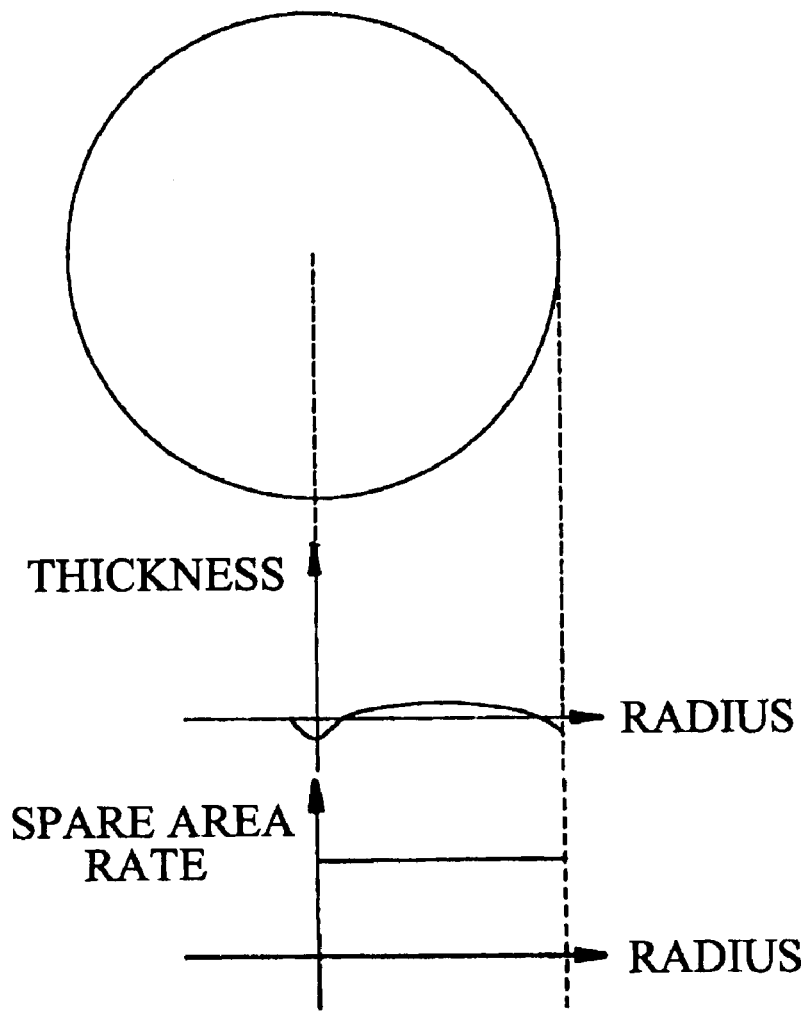
FIG. 2 is a view showing variations in thickness and spare area rate in the radial direction of a conventional optical disc.
Figure 3:
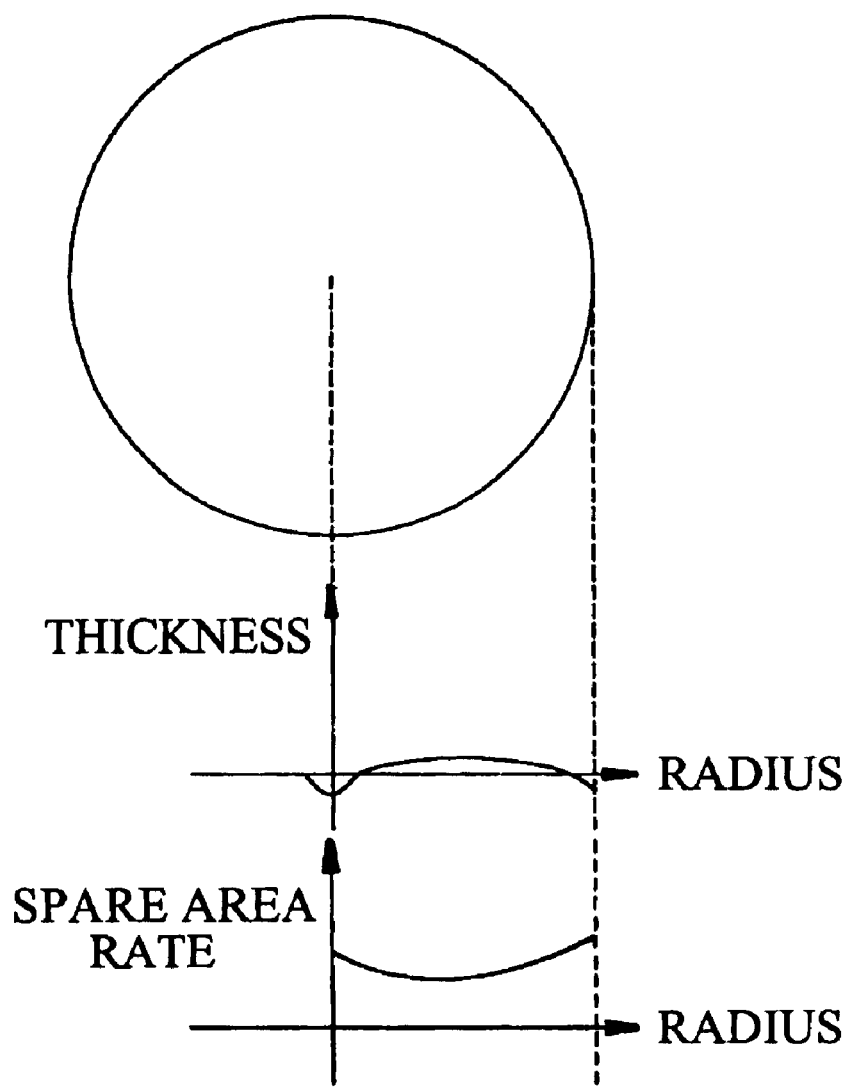
FIG. 3 is a view showing variations in thickness and spare area rate in the radial direction of an optical disc according the present invention.

When arranging the rates of spare areas in the present invention, the total quantity of the spare areas during fabrication of an optical disc according to the present invention is set to be identical to that of the optical disc that has the typical spare areas. Also, in arranging the spare areas, it is constructed such that the sizes of the spare areas arranged onto the inner circumferential portion or outer circumferential portion are relatively larger than those of the spare areas arranged onto the center portion by considering the above-mentioned thickness characteristics of the recording layer of the optical disc, as shown in FIG. 2. In the present invention, the term "spare area rate" means the rate of a spare area to a zone area.

However, the present invention is not have limited to the above-described embodiment, but can be applied to the optical disc that does not have the typical spare areas.

A fabricating method of the optical disc is largely performed by steps of forming a stamper, of injection-molding a transparent substrate having a thickness of about 0.6 nm by using the prepared stamper, of covering a recording layer over the molded transparent substrate by using a continuous-type sputter, and of adhering the disc formed with the recording layers. The detailed steps are of the well-known in the art, of which detailed description will thus be deleted.

For the purpose of examining the reliabilities of the optical disc having the variable rates of spare areas according to the present invention and the optical disc having the conventional fixed spare areas as presented in <Table 1>, a comparative example having the rate based on <Table 1> is compared with first and second embodiments of the present invention having the rates resulting respectively from <Table 2> and <Table 3> to be described later, thereby being tested.

The fabrication of the optical, disc according to the first embodiment of the present invention is identical to that of the optical disc of the conventional technique which is to be the comparative object until forming the recording layer.

In other words, a widely-used mastering facility of Sony Co. is employed for fabricating the stamper, and the transparent substrate having the thickness of about 0.6 mm is injection-molded by using the fabricated stamper. At this time, a molder of Meiki Mfg. (Japan) is employed while using polycarbonate (product of GE). The molded transparent substrate is covered with the recording layer by using the continuous-type sputter of Jinko Co. of Japan.

Then, the spare areas occupying a predetermined rate of the capacity (number of blocks is 76424) of the total zone (23) of the optical disc, fabricated as above, are formed. The optical disc having the spare areas stated in <Table 1> is prepared as the comparative example. That is, it is installed in a manner that the rate of the spare areas is to be 5.37% (number of blocks is 4104), and the rate of the spare area with respect to each zone capacity is to be 5.37%.

Also, in the first embodiment of the present invention, the total zone capacity and rate of the spare area of the optical disc fabricated as above are identically installed. Except that, it is arranged such that the spare rates with respect to the sizes of the recording area within respective zones has the rate as shown in <Table 2>.

TABLE 2

| Zone | Size of Recording Area (No. of blocks) | Size of Spare Area (No. of blocks) | Rate (%) |
|---|---|---|---|
| 0 | 1901 | 204 | 10.73% |
| 1 | 2010 | 216 | 10.75% |
| 2 | 2122 | 171 | 8.06% |
| 3 | 2234 | 180 | 8.06% |
| 4 | 2346 | 126 | 5.37% |
| 5 | 2458 | 132 | 5.37% |
| 6 | 2570 | 69 | 2.68% |
| 7 | 2682 | 72 | 2.68% |
| 8 | 2792 | 75 | 2.69% |
| 9 | 2904 | 78 | 2.69% |
| 10 | 3016 | 81 | 2.69% |
| 11 | 3128 | 84 | 2.69% |
| 12 | 3240 | 87 | 2.69% |
| 13 | 3352 | 90 | 2.68% |
| 14 | 3464 | 93 | 2.68% |
| 15 | 3576 | 96 | 2.68% |
| 16 | 3686 | 99 | 2.69% |
| 17 | 3798 | 102 | 2.69% |
| 18 | 3910 | 210 | 5.37% |
| 19 | 4022 | 216 | 5.37% |
| 20 | 4134 | 333 | 8.06% |
| 21 | 4246 | 342 | 8.05% |
| 22 | 4358 | 468 | 10.74% |
| 23 | 4475 | 480 | 10.73% |
| Total | 76424 | 4104 | 5.37% |

That is, it is changed such that zone 0 is to 10.73% zone is to 10.75% zones 2 and 3 are to 8.06%, zones 4 and 5 are to 5.3%, zones 6 and 7 are to 2.68%, zones 8 to 12 are to 2.69%, zones 13 to 15 are to 2.68% zones 16 and 17 are to 2.69%, zones 18 and 19 are to 5.37%, zone 20 is to 8.06%, zone 21 is to 8.05%, zone 22 is to 10.74%, and zone 23 is to 10.73%. Here, the total mean rate is to be approximately 5.37%.

The second embodiment of the present invention is fabricated in the identical manner to the aforementioned comparative example and first embodiment. In other words, the rate with respect to the capacity of the total zone of the optical disc is identical by 5.37%, built the size rates of the spare areas with respect to respective zone sizes are to be as shown in <Table 3>.

TABLE 3

| Zone | Size of Recording Area (No. of blocks) | Size of Spare Area (No. of blocks) | Rate (%) |
|---|---|---|---|
| 0 | 1901 | 153 | 8.05% |
| 1 | 2010 | 162 | 8.06% |
| 2 | 2122 | 171 | 8.06% |
| 3 | 2234 | 180 | 8.06% |
| 4 | 2346 | 126 | 5.37% |
| 5 | 2458 | 132 | 5.37% |
| 6 | 2570 | 69 | 2.68% |
| 7 | 2682 | 72 | 2.68% |
| 8 | 2792 | 75 | 2.69% |
| 9 | 2904 | 78 | 2.69% |
| 10 | 3016 | 81 | 2.69% |
| 11 | 3128 | 84 | 2.69% |
| 12 | 3240 | 87 | 2.69% |
| 13 | 3352 | 90 | 2.68% |
| 14 | 3464 | 93 | 2.68% |
| 15 | 3576 | 96 | 2.68% |
| 16 | 3686 | 198 | 5.37% |
| 17 | 3798 | 204 | 5.37% |
| 18 | 3910 | 210 | 5.37% |
| 19 | 4022 | 324 | 8.06% |
| 20 | 4134 | 333 | 8.06% |
| 21 | 4246 | 342 | 8.05% |
| 22 | 4358 | 351 | 8.05% |
| 23 | 4475 | 390 | 8.72% |
| Total | 76424 | 4101 | 5.37% |

In the foregoing first and second embodiments overall size of the spare areas is unchanged to prevent the recording capacity of the optical disc from being degraded. The optical discs of three kinds of the comparative example, first and second embodiments are prepared by as many as 20 sheets for each to test the reliability.

The reliability test is executed for observing and measuring the defect of the disc after exposing the disc to severe surroundings. For instance, the sever surroundings are such that respective optical discs are exposed for 15 days under the condition of a temperature of 60° C. and a relative humidity of about 90%. After exposing to the external environment, they are left intact 24 hours at the normal temperature, and then measured.

That is, the defective extent of the discs at respective discs is measured to compare the spare areas provided to respective zones, so that the number of discs (defective discs) depleting all spare areas is evaluated. As the result, in this test, five defective discs are detected from the comparative example while no detective disc is detected from the first and second embodiments of the present invention.

In view of the result of studying the state of the above-menitioned defective discs, the defects mostly occur at the zones of inner circumference and outer circumference sides of the discs. When the defect is excessive, all preset spare areas are depleted to be decided as the defective disc.

In consideration of the first and second embodiments of the present invention the defect occurs similarly to the comparative example. But relatively large spare areas are installed to the inner circumferential portion and outer circumferential portion of the optical disc as stated in foregoing <Table 1>and <Table 2>. Thus, the defect occurring rate is low.

In the optical disc fabricated by the method for setting the spare areas of the optical disc according to the present invention, the rate of the spare areas of respective zones are adjusted without changing the overall size and distribution of the spare areas within the zones of the rewritable optical disc. In other words, more spare areas are installed to the inner circumferential and outer circumferential portions of the optical disc, and less spare areas are installed to the center portion which is the relative stable portion of the optical disc. As a result, the defect rate is minimized to be able to decrease the number of defective discs. By doing so, the reliability of the optical disc is heightened, and the problem resulting from the inconsistency of the optical disc can be solved.

While the present invention has been particularly shown and described with reference to particular embodiments thereof it will be understood by those skilled in the art that various changes in form and details may be effected therein without departing from the spirit and scope of the invention as defined by the appended claims.

What is claimed is:

1. An optical disk, comprising:
   a series of several main areas and arranged to store digital data; and a series of contiguous spare areas, each main area corresponding to a respective single one of the contiguous spare areas, a ratio between a size of each main area to a size of a corresponding contiguous spare area being varied, wherein the ratio of the size of the spare areas to the size of the corresponding main areas increases from a substantially central radial position on the disk toward at least one of an inner radial position on the disk and an outer radial position on the disk.

2. The optical disk of claim 1, wherein each of the contiguous spare areas is positioned adjacent to a corresponding one of the series of main areas.

3. The optical disk of claim 1, wherein the ratio between the size of a spare area and the size of a corresponding main area depends upon a thickness of the disk at the position of the main area.

4. The optical disk of claim 1, wherein the ratio between the size of a spare area and the size of a corresponding main area depends upon a radial position of the main area on the disk.

5. The optical disk of claim 1, wherein the ratio of the size of the spare areas to the size of the corresponding main areas increases from the substantially central radial position on the disk toward the inner radial position on the disk.

6. The optical disk of claim 1, wherein the ratio of the size of the spare areas to the size of the corresponding main areas increases from the substantially central radial position on the disk toward the outer radial position on the disk.

7. A method for setting spare areas of corresponding main zones of an optical disk, said method comprising:
   configuring an optical disk with a series of several main areas structured and arranged to store digital data, each main area having a single contiguous spare area associated therewith; and
   variably setting a ratio between a size of each contiguous spare area to a size of each main area associated therewith, wherein the ratio of the size of the spare areas to the size of the corresponding main areas increases from a substantially central radial position on the disk toward at least one of an inner radial position on the disk and an outer radial position on the disk.

8. The method of claim 7, wherein each of the contiguous spare areas is positioned adjacent to a corresponding one of the series of main areas.

9. The method of claim 7, wherein the ratio between the size of a spare area and the size of a corresponding main area depends upon a thickness of the disk at the position of the main area.

10. The method of claim 7, wherein the ratio between the size of a spare area and the size of a corresponding main area depends upon a radial position of the main area on the disk.

11. The method of claim 7, wherein the ratio of the size of the spare areas to the size of the corresponding main areas increases from the substantially central radial position on the disk toward the inner radial position on the disk.

12. The method of claim 7, wherein the ratio of the size of the spare areas to the size of the corresponding main areas increases from the substantially central radial position on the disk toward the outer radial position on the disk.

13. An optical disk, comprising:
   a plurality of concentric zones, each zone including at least one main area for storing data and at least one spare area for storing data when the main area includes a defect, each zone having a spare area ratio equal to a ratio of a total size of spare areas in the zone to a total size of main areas in the zone, wherein the spare area ratio increases from a substantially central radial position on the disk toward at least one of an inner radial position on the disk and an outer radial position on the disk.

14. The optical disk of claim 13, wherein the spare area ratios of at least two adjacent zones differ.

15. The optical disk of claim 1, wherein the ratio of the size of the spare areas to the size of the corresponding main areas increases from the substantially central radial position on the optical disk toward the inner radial position on the disk and toward the outer radial position on the disk.

16. The method of claim 7, wherein the ratio of the size of the spare areas to the size of the corresponding main areas increases from the substantially central radial position on the optical disk toward the inner radial position on the disk and toward the outer radial position on the disk.

17. The optical disk of claim 13, wherein the spare are ratio increases from the substantially central radial position on the disk toward the inner radial position on the disk.

18. The optical disk of claim 13, wherein the spare are ratio increases from the substantially central radial position on the disk toward the outer radial position on the disk.

19. The optical disk of claim 13, wherein the spare area ratio increases from the substantially central radial position on the optical disk toward the inner radial position on the disk and toward the outer radial position on the disk.

* * * * *